Figure 1:
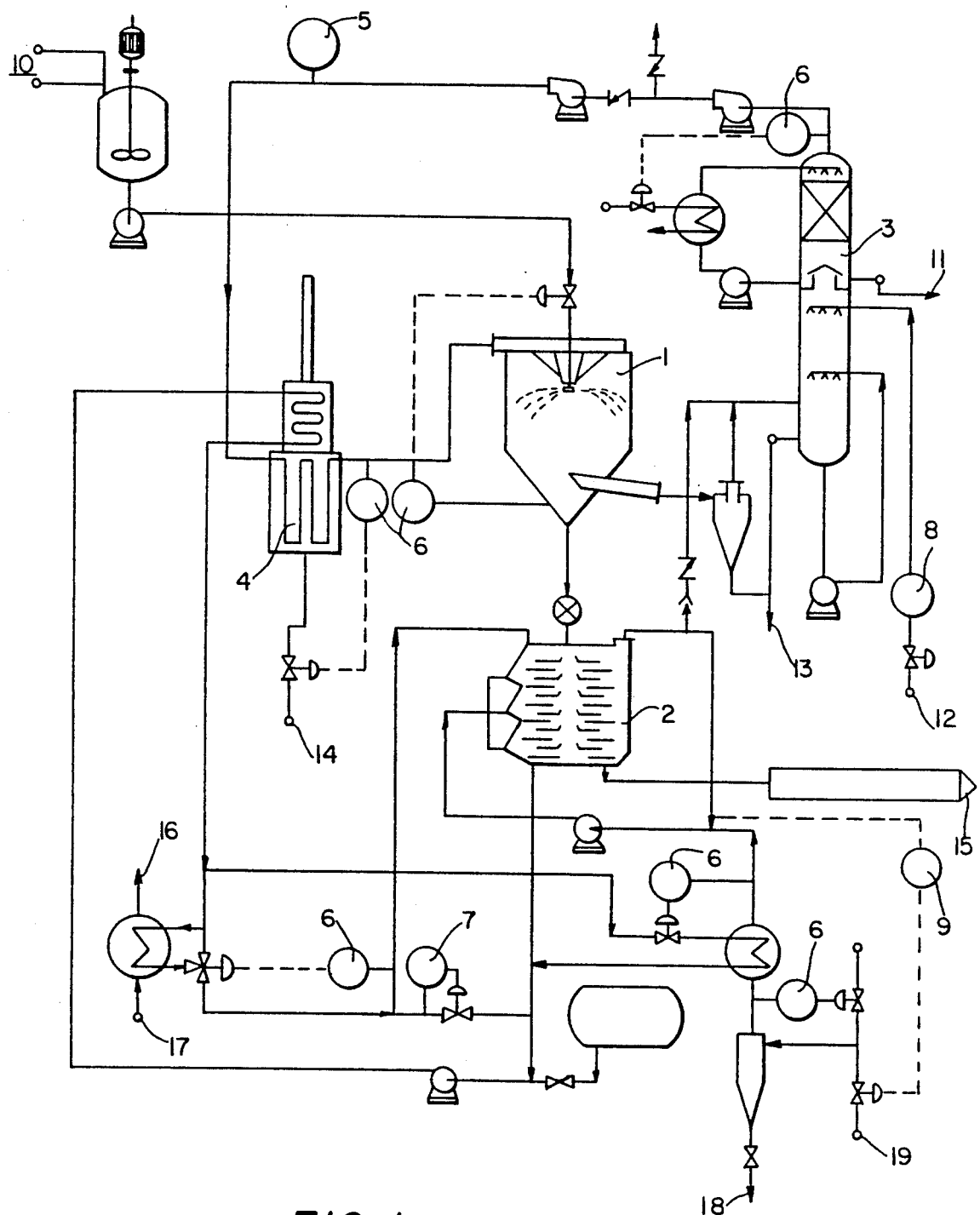

United States Patent [19]

Garcia

[11] Patent Number: 5,011,672
[45] Date of Patent: Apr. 30, 1991

[54] PROCESS FOR PRODUCING POTASSIUM MANGANATE

[75] Inventor: D. Manuel O. G. Garcia, Oviedo, Spain

[73] Assignee: Industrial Quimica Del Nalon, S.A., Oviedo, Spain

[21] Appl. No.: 353,145

[22] Filed: May 1, 1989

Related U.S. Application Data

[63] Continuation of Ser. No. 49,696, May 14, 1987, abandoned.

[30] Foreign Application Priority Data

May 16, 1986 [ES] Spain .................................. 555072

[51] Int. Cl.$^5$ .............................................. C01G 45/12
[52] U.S. Cl. ....................................... 423/599; 423/49
[58] Field of Search .................................. 423/49, 599

[56] References Cited

U.S. PATENT DOCUMENTS

| 2,617,710 | 11/1952 | Kielland et al. | 423/194 |
| 2,940,821 | 6/1960 | Carus et al. | 423/599 |
| 2,940,823 | 6/1960 | Reidies et al. | 423/599 |

FOREIGN PATENT DOCUMENTS

| 597093 | 4/1960 | Canada | 423/599 |
| 0225855 | 8/1985 | Fed. Rep. of Germany | 423/599 |
| 150828 | of 1961 | U.S.S.R. | 423/49 |
| 346229 | 8/1972 | U.S.S.R. | 423/599 |
| 0865813 | 9/1981 | U.S.S.R. | 423/599 |
| 842745 | 7/1960 | United Kingdom | 423/599 |
| 800548 | 2/1961 | United Kingdom | 423/599 |

OTHER PUBLICATIONS

Journal of Industrial and Engineering Chemistry, Apr. 1919, pp. 317-323, vol. II.
Chem Abstract, vol. 47 1953 1346.

Primary Examiner—Theodore Morris
Assistant Examiner—Edward Squillante
Attorney, Agent, or Firm—Mason, Fenwick & Lawrence

[57] ABSTRACT

Potassium manganate is produced by mixing finely ground manganese ore with a solution of potassium hydroxide (having a concentration of about 50% W/V) in a mole ratio $KOH/MnO_2$ between 2 and 3. The resulting suspension is fed continuously to an atomization dryer and then to a plate dryer.

32 Claims, 3 Drawing Sheets

PROCESS FOR PRODUCING POTASSIUM MANGANATE

This application is a continuation of application Ser. No. 049,696, filed May 14, 1987 now abandoned.

Potassium permanganate ($KMnO_4$) is a product having high oxidizing power and which, as such, has a broad field of application in the pharmaceutical industry and in organic synthesis processes, it is used as an oxidizing material having a controllable action, and new applications are constantly appearing in this field.

In the treatment of water and processes for rendering the latter potable, the use of potassium permanganate is widespread in the more developed countries and is constantly advancing in the developing countries. The oxidizing action of potassium permanganate is exerted as a biocide for the microfauna and microflora present in the water, as an agent which destroys dissolved or suspended organic matter (phenols, organic bases, odours, and the like), as an algicide and fungicide, and for insolubilizing heavy materials (Fe, Mn). As a residue of the oxidizing action, there remains an insoluble and flocculant manganese dioxide, which has absorbent properties with respect to the heavier ions and is easy to separate by filtration or decantation.

Potassium permanganate has broad application in the treatment and suppression of odors and troublesome effluvia emanating from very diverse types of industrial activities. It also finds application in the treatment of certain discharges to adapt them to the prevailing standard.

In agriculture, it has recently been used for maintaining algae and fungi under control in irrigation ditches and modern irrigation systems. Its topical use on trees and plants as a fungicide is also recent, and its acceptance is based on its efficacy and on the fact that the only residue left by the treatment is manganese dioxide, an inert and completely harmless product for plants in general. In the preservation of fruit in storerooms, permanganate is used for maintaining the atmosphere under control and avoiding the accumulation of ethylene and other gases which act as catalysts of ripening.

In the farming industry, potassium permanganate is used as a disinfectant in combination with formaldehyde.

Potassium permanganate finds application in the pickling and cleaning of steel plates and wires.

This whole spectrum of applications of potassium permanganate, and the potential appearance of further new applications based on its oxidizing power, make it a product of economic and commercial importance and fresh interest.

The production of potassium permanganate in any case represents a long and complex process, involving high energy consumption. The research and development efforts of the undertakings which produce permanganate have been directed essentially at modernizing the processes through the application of new technology, and improving the basic designs so as to reduce the costs of conversion and to be able to use raw materials which are more readily available and cheaper.

The existing processes for manufacturing potassium permanganate (both so-called roasting processes and liquid-phase processes) are significantly limited in their operability by problems of corrosion and wear of equipment, protracted residence time of materials being processed (slow rate of conversion), limited versatility in the use of ores which vary in their richness in $MnO_2$ and in the level and type of impurities and, specifically in the case of liquid-phase processes, the need to operate with a large excess of potassium hydroxide (mole ratio $MnO_2/KOH$ equal to or less than 1/10).

In general, the process of conversion of the manganese ore to potassium permanganate consists of a series of stages, comprising:

The preparation of the ore (drying and grinding).

Mixing with potassium hydroxide (KOH) in precise proportions.

The attack and disintegration of the ore through the effect of the potassium hydroxide under suitable conditions of concentration and temperature.

The oxidation of the disintegrated ore in an oxidizing atmosphere to the valency $Mn^{6+}$, in the form of $K_2MnO_4$.

The dissolution in water of the potassium manganate ($K_2MnO_4$) obtained and the separation of impurities originating from the ore.

The oxidation of manganate ($Mn^{6+}$) to permanganate ($Mn^{7+}$) via electrolysis.

The crystallization of the potassium permanganate obtained and the separation and drying of the crystals.

Manganese dioxide ores (pyrolusite) show a varied petrographic structure and consequently unequal hardness and consistency. Before it can be subjected to the process of physical conversion, the ore is ground to the degree of fineness required for the process, normally below 80 microns.

Disintegration of pyrolusite ore by potassium hydroxide (KOH)

A suspension of ground pyrolusite ore in concentrated potassium hydroxide (KOH) (65% by weight), heated to temperatures above 180° C., undergoes a series of conversions.

The mixture, which at the beginning possesses a greyish-black hue, gradually assumes a chestnut-brownish hue at the same time as the suspension becomes converted to a gel and the mixture acquires greater consistency. In this conversion, the ore disintegrates and combines with the potassium hydroxide, at a rate which increases with the temperature and the concentration of potassium hydroxide.

Manganese dioxide ($MnO_2$) probably combines with the potassium hydroxide in two successive phases, according to the following chemical equation:

$$MnO_2 + KOH \rightarrow MnO_2 \cdot KOH \qquad 1.$$

$$MnO_2 \cdot KOH + KOH \triangle K_2MnO_3 + H_2O \qquad 2.$$

Both reactions are endothermic and are favoured by an increase in temperature.

Both reactions give rise to a phenomenon of dilution of the potassium hydroxide solution, which tends to reduce its rate.

Above 180° C., the reaction system absorbs oxygen when in contact with a medium which contains it, and the manganese changes selectively to the next higher degree of oxidation ($Mn^{5+}$), according to the reaction:

$$2T_2MnO_3 + 2\,KOH + 1/2\,O_2 \rightarrow 2\,K_3MnO_4 + H_2O \qquad 3.$$

As the reaction progresses, the material changes from a dark chestnut-brown hue to the pale blue hue of the hypomanganate formed ($K_3MnO_4$). This product is very soluble and the consistency of the medium gradually decreases. It is presupposed that the ore is originally dispersed in a large excess of potassium hydroxide.

The necessary oxygen can originate from a gaseous medium (air, gas with variable proportions of oxygen), or from a suitable oxidizing agent. The presence of potassium manganate ($K_2MnO_4$) in the medium acts as an efficient oxidizing agent. In this case, the overall reaction can be written as follows:

$$MnO_2 + K_2MnO_4 + 4\ KOH \rightarrow 2\ K_3MnO_4 + 2\ H_2O \qquad 4.$$

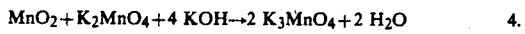

While there is reactive $MnO_2$ in the system, the stable product is $K_3MnO_4$ ($Mn^{5+}$).

If oxygen continues to be supplied to the system, and once the available $MnO_2$ has been used up, the temperature still being above 180°–200° C., the hypomanganate ($K_3MnO_4$) formed gradually oxidizes to manganate ($K_2MnO_4$) in which the manganese is in the form of $Mn^{6+}$. The reaction can be simplified as follows:

$$2\ K_3MnO_4 + H_2O + 1/2\ O_2 \rightarrow 2\ K_2MnO_4 + 2\ KOH \qquad 5.$$

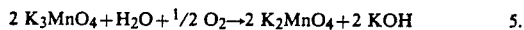

The manganate ($K_2MnO_4$) formed comes out of solution in proportion to the rate at which it is produced in the form of violet-coloured crystals. This reaction is reversible, and the equilibrium state depends on the conditions of temperature, partial pressures of environmental water and oxygen, and the like.

If the process is carried out in the atmosphere in the presence of $H_2O$ and $O_2$, the reactions (1), (2), (3), (4) and (5) can coexist until the manganese dioxide ($MnO_2$) present in the ore is used up. Under favourable conditions, virtually all the manganese in the ore can be converted to $Mn^{6+}$ as potassium manganate ($K_2MnO_4$).

The pyrolusite ore contains, in addition to manganese dioxide, other impurities which are present in the reaction medium, and some of these compete for the potassium hydroxide. Thus, alumina and silica, under the working conditions, are converted completely or partially to soluble aluminates and silicates. In some methods of carrying out the process, these impurities are accumulative, and for this reason it is necessary to limit the content of them in the raw material, making obligatory the use of richer ores which are consequently much more expensive.

The invention which is the subject of the patent application simplifies the process, reduces the costs of conversion and enables cheap raw materials, which are exceptionally abundant and readily available, to be used in its production.

The essential raw material in the production of potassium permanganate is manganese dioxide ($MnO_2$) ore. The process which is the subject of the present invention enables use to be made, with a high yield, of manganese ores in which the abundance of manganese dioxide ($MnO_2$) is between 70 and 80%, which are obtained from the majority of deposits being worked and which are used on a vast scale in steel metallurgy.

Since the rate of the reaction of attack and oxidation of the ore, which is the subject of the invention, is determined by phenomena of potassium hydroxide concentration, temperature and heat transfer, the concept which governs the whole method resides in the use of reaction units which are as small as possible, with the object of facilitating the transfer phenomena to the maximum extent, and atmospheres which are well controlled as regards their partial pressures of water and oxygen and their temperatures.

The reaction mixture is a suspension of finely ground (98% <80 microns) pyrolusite ore in potassium hydroxide (KOH) solution at 50% strength by weight (w/w). The mole ratio $KOH/MnO_2$ of the mixture can vary from 2 to 3, depending on the type of pyrolusite and its impurities, approaching the optimum at values normally close to 2.5. The mixture is maintained agitated to ensure its homogeneity. Under these conditions, the mixture can be pumped and circulated through pipes under flow control, and generally handled under ambient conditions, for controlled feeding to a process reactor.

The potassium hydroxide (KOH) is preferably used at a concentration of 50% by weight (w/w), since it is commercially available at this concentration and is easy to handle. Other concentrations can also be employed.

The mixture of ore and potassium hydroxide is subjected to a process of attack and disintegration of the ore and oxidation of the manganese dioxide to manganate ($K_2MnO_4$) in two successive phases, and in two reactors of different design which are connected in series and fed continuously.

To assist understanding, the attached FIG. 1 is a diagram of an assembly of equipment in which the oxidation of manganese dioxide takes place, in which diagram the components are shown as follows:

No. 1 — atomization reactor
No. 2 — plate reactor
No. 3 — air-conditioning column
No. 4 — furnace for heating air
No. 5 — FI
No. 6 — TIC
No. 7 — PIC
No. 8 — FIC
No. 9 — $O_2IC$
No. 10 — KOH and $MnO_2$
No. 11 — condensate
No. 12 — cold mother liquors
No. 13 — hot mother liquors for dissolving $K_2MnO_4$
No. 14 — fuel
No. 15 — $K_2MnO_4$ in solution
No. 16 — steam
No. 17 — condensate
No. 18 — condensate purge
No. 19 — $O_2$ The first reactor is based on the design of atomization dryers, with the adaptation required for the specific process which is described in detail below.

Figure 2:
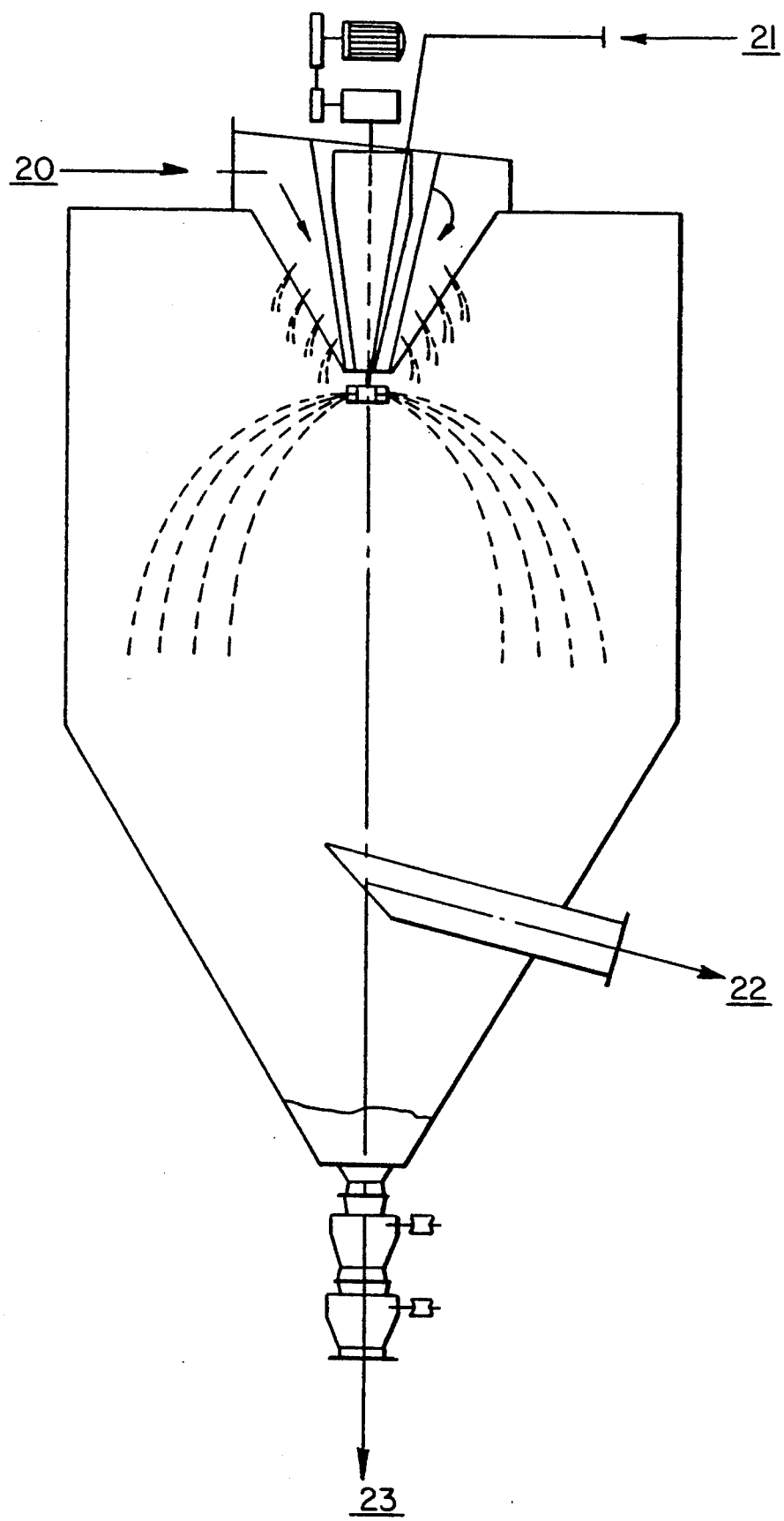

FIG. 2 shows the atomization reactor, illustrating its functional nature. In this figure the components are as follows:

No. 20 — hot air
No. 21 — reaction mixture
No. 22 — air
No. 23 — solid product

In the atomization reactor, the reaction mixture is fed continuously to a centrifugal atomizer, equipped with atomizer nozzles constructed in anti-abrasive material. Pyrolusite ore is highly abrasive, and only materials such as tungsten carbide, alumina or silicon carbide usefully withstand the abrasive action of the mixture.

The centrifugal atomizer rotates at high speed and atomizes the mixture into the reactor chamber in a horizontal plane. The size of the drops of mixture formed in the atomization is critical for the process, and depends on the tangential velocity of the centrifugal atomizer, the viscosity of the mixture, the particle size of the suspended ore, and the like. With the other conditions constant, the drop size is controlled, by adjusting the speed of rotation of the centrifugal atomizer, to be below a specified size. This size is such that, with the reactor running, the drops are unable to reach the reactor wall facing the centrifugal atomizer.

For a centrifugal atomizer 200 mm in diameter in an atomization chamber 6 m in diameter, at a feed flow rate of 2,000 kg/h of reaction mixture and 16,000 m$^3$/h of hot process gas entering the reactor, the minimum speed of rotation of the wheel is of the order of 14,000 rpm. Lower speeds give rise to excessively large drops, the inertia of which enables them to pass through the circulating process gas and arrive at the reactor-wall before reacting, aggregating and giving rise to deposits on the wall which hinder the operation of the reactor.

The nebulized mixture which emerges from the centrifugal atomizer encounters a swirling stream of conditioned air which has an almost vertical component and has been heated to a temperature of the order of 500° C. ($\pm 100°$ C.). The air acts as the only vehicle for transferring heat to the reactor, and as a carrier for the oxygen and water which participate in the reactions which take place. The partial pressures of oxygen and water in the air are controlled prior to their admission to the reactor.

Once the reaction mixture is atomized, every drop formed behaves as an independent reaction unit.

The drop formed, with a high surface/mass ratio and a large $\Delta t$ in comparison with the gaseous atmosphere which it encounters, is very rapidly subjected to heat transfer and mass transfer phenomena.

As a first effect, the drop is heated and loses water. The potassium hydroxide present gradually becomes concentrated. Once the requisite concentration of potassium hydroxide and process temperature have been reached, the ore disintegrates and absorbs oxygen from the gaseous medium and the manganese oxidizes to higher valencies, in accordance with the chemical equations (1), (2), (3), (4) and (5).

As the reaction drop advances towards the bottom of the reactor, the free potassium hydroxide undergoes conversion to manganese salts and the whole undergoes conversion to a solid particle. When the particle arrives at the conical wall of the bottom of the reactor, the potassium hydroxide should have disappeared from the reaction medium and the assembled particles should slide in the form of a powder over the bottom wall and emerge continuously through a bottom valve of the reactor. The presence of free potassium hydroxide in the particles acts as a binder and gives rise to the aggregation of some particles with others and adhesion of the material to the walls, obstructing the outflow of the material from the reactor.

The gaseous mass, which circulates through the reactor as the reacting material advances, gradually cools down, and it increases its content of water vapour originating from the reaction medium and releases the oxygen required in order for the oxidation reactions to take place.

Once its function has been performed, the gaseous mass is extracted through a collector which branches from the axis of the reaction chamber in the vicinity of the bottom. The whole mass moves inside the reactor along lines in the form of a descending spiral as a result of the cyclonic effect to which the gaseous mass is subjected as it enters the chamber. This permits efficient separation of the two phases, solid and gaseous, in the bottom of the reactor.

The sliding of the solid material originating from the reaction over the reactor walls is facilitated by the periodic striking of a series of uniformly spaced hammers positioned on the walls of the reactor. The whole reaction chamber is suitably insulated to avoid heat loss to the outside.

The residence time of the materials in the reactor should be greater than 20 seconds and normally between 40 and 50 seconds. The capacity and volume of the reactor are designed with this criterion in mind. Thus, to process an ore having an 80% abundance of $MnO_2$ at a capacity of 500 kg/h, about 15,000 kg/h of conditioned air at 500° C. are required, and a reactor chamber of capacity 180/200 m$^3$ with a diameter of 6 m and a height of the cylindrical portion of 6 m.

The working capacity of the reactor is established maintaining the process air at a constant flow rate and temperature. The heat balance and material balance are controlled by means of the temperature of the gas at the outflow from the reactor, which acts as an instruction for a regulator which operates a valve for admission of reaction material which is fed to the reactor.

The temperature setting is established according to the degree of conversion which is required in the material which emerges from the reactor. The temperature is normally between 200° and 300° C., and the process is preferably carried out in the vicinity of 270° C.

As this temperature is increased, the rate of the reactions which take place increases, and at the same time their equilibrium is affected. The reaction product should be a dry powder which slides easily over the conical wall of the bottom of the reactor and which can be discharged easily as it forms, under the action of gravity.

The reaction product has the appearance of a matt powder, which is variable in hue between bluish and violet. The products which take part in its composition are essentially those of the reactions (3) and (5), that is to say potassium hypomanganate ($K_3MnO_4$) and potassium manganate ($K_2MnO_4$), and part (2 to 5%) as undisintegrated ore, corresponding to the coarsest particles which are not attacked in the short residence time in the reactor.

In the reaction product, the gangue, converted according to its behaviour in the reaction medium, is also present.

The reaction (5) releases potassium hydroxide (KOH)

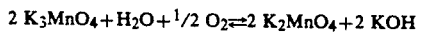

$$2\ K_3MnO_4 + H_2O + 1/2\ O_2 \rightleftharpoons 2\ K_2MnO_4 + 2\ KOH$$

Under the working conditions, the potassium hydroxide is molten and acts as a binder and aggregating agent for the reaction material, these effects being undesirable. The degree to which this reaction takes place can be controlled by acting on the partial pressures of water and oxygen in the gaseous medium of the reactor. For this purpose, part of the gas emerging from the reactor is recirculated after being mixed with air and oxygen and conditioned in a tower outside the reactor, in accordance with the diagram shown in FIG. 1.

This tower consists of two sections. In the first, the gas emerging from the reactor exchanges and transfers its sensible and latent heats to an aqueous solution of potassium hydroxide and potassium permanganate which is used as a vehicle in subsequent phases of the process for producing potassium permanganate. In this way, good use is made of heat derived from the reactor, the operation of the latter being integrated with the remainder of the process, reducing the costs of conversion.

In the second section of the tower, the gas is conditioned in respect of its partial pressure of water, p H$_2$O, which controls its water saturation temperature.

Figure 3:
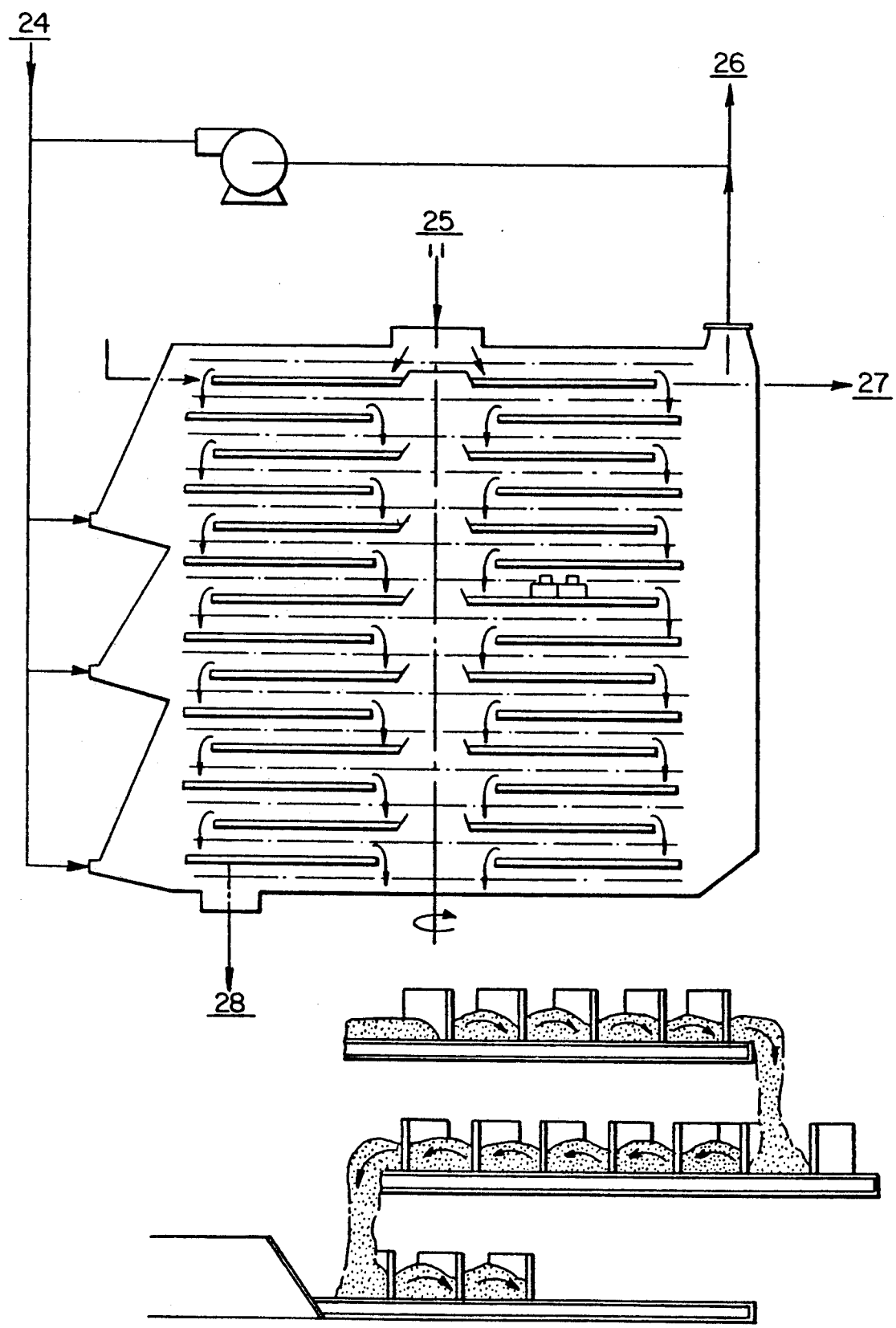

The partial pressure of oxygen, p O$_2$, in the recirculated gas is achieved by means of a partial make-up of the latter with air or oxygen, as shown in the diagram in FIG. 3.

The conditioned gas is recirculated to the reactor at a controlled flow rate after being heated to the appropriate temperature (500° C.) in a tube nest furnace.

The working capacity of the assembly, measured as kg/h of pyrolusite ore treated, is regulated by acting on the flow rate of the recirculated gas, on its temperature or on the concentration of potassium hydroxide in the reaction mixture.

The assembly results in great versatility in handling, as regards both its capacity and its regulation, and makes it possible to disintegrate the ore and to accomplish the oxidation of the manganese dioxide, in a very short space of time, to higher valency states of manganese (Mn$^{5+}$ and Mn$^{6+}$) which act as necessary intermediates in the process for producing potassium permanaganate (KMnO$_4$).

The notion of carrying out this phase of the process by reducing the reacting material to microscopic drops, to facilitate to the maximum the heat transfer and mass transfer phenomena involved in the process, has enabled the reaction time and residence time to be reduced to seconds, from the hours or days which were necessary before this invention appeared.

The oxidized and powdered solid material which emerges continuously under gravity from the atomization reactor passes through valves, which isolate the gaseous phase, to a plate reactor.

In this reactor, the conditions are established for converting manganese to potassium managanate (K$_2$MnO$_4$). The main reaction to be carried out is that represented in chemical equation (5):

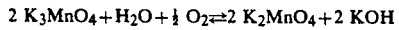

$$2\ K_3MnO_4 + H_2O + \tfrac{1}{2}\ O_2 \rightleftharpoons 2\ K_2MnO_4 + 2\ KOH$$

The design of the reactor is based on a plate dryer which is shown in FIG. 3, in which the components are detailed as follows:

No. 24 — supply of H$_2$+O$_2$
No. 25 — admission of products
No. 26 — excess H$_2$+O$_2$
No. 27 — outflow of the heat transfer fluid
No. 28 — outflow of the product The reactor consists essentially of a series of plates arranged horizontally above each other in a cylinder. Each disc is heated from underneath. A series of blades attached radially to a rotating spindle distributes the material in the form of a layer on each plate, turns it over continuously and causes it to advance radially to be spilled onto the following plate, the direction being alternated, on one plate towards the centre of the plate and on the next towards the periphery. In this way, the reacting material moves in a zig-zag from plate to plate and, in the process of being turned over and transported, is exposed to the oxidizing atmosphere which surrounds it.

The plates can have a false bottom or a tube underneath in the form of a coil, through which a heat transfer fluid circulates at a controlled temperature.

The number of plates can be variable, the residence time of the material in the reactor, which can vary between 20 and 60 minutes, being important and being controlled by means of a variable-speed motor which drives the shaft to which the system of blades is attached.

The oxidizing atmosphere is preferably formed by a mixture of O$_2$ and H$_2$O in a mole ratio H$_2$O/O$_2$ of 2:1. It can also be air and water vapour at a mole ratio H$_2$O/O$_2$ close to 2:1.

The gaseous mass is caused to circulate inside the reactor at high speed, to promote heat transfer and mass transfer with the reacting material, by means of pumping through an external circuit.

The oxygen is fed continuously under controlled flow to the reactor at slightly above the stoichiometric requirements, and is saturated with water vapour at the appropriate temperature for obtaining a mixture which has the programmed mole ratio H$_2$O/O$_2$ for the reactor.

An oxygen concentration detector continuously measures its proportion in the gaseous atmosphere of the reactor and serves as the basis on which a controller adjusts to the requisite value the proportion of H$_2$O/O$_2$ fed to the reactor. The reactor operates at ambient pressure and the excess gas is fed as a means of supplying oxygen to the first atomization reactor.

The working temperature can vary between 200° and 300° C. Preferably, the process is carried out at temperatures close to 240° C.

The reaction product emerges continuously from the reactor and is collected in a dissolving tank in which it dissolves, in its turn, in continuous fashion.

As the reacting material advances in the reactor, it loses its pulverulent nature and assumes a granular appearance, becoming continually more violet in hue. Since potassium hydroxide (KOH) is produced in the reaction and, under the reaction conditions, is in the liquid state and acts as an aggregating agent, an excess of potassium hydroxide can give rise to a pasty reaction product which cannot be handled in the reactor. The mole ratio KOH/Mn is critical in this second reactor also. The appropriate ratio is close to 2.5, and is adjusted when the mixing of the manganese ore and potassium hydroxide is carried out.

For each manganese ore, it is necessary to make an efficacious adjustment to the optimum KOH/Mn ratio, due to the interfering effect exerted by some impurities in the ore on the potassium hydroxide content (alumina and silica).

The plate reactor is complementary to the atomization reactor, and the two form an integrated assembly which enables manganese dioxide to be converted chemically to potassium manganate (K$_2$MnO$_4$), an essential intermediate in the process of manufacturing potassium permanganate. The process is thereby carried out continuously, in two independently controlled stages, to achieve maximum conversion.

The conversion yield is always high, even when starting with poor, cheap ores such as those used in the steel industry, and values higher than 95% are normally achieved.

In addition to manganese dioxide ores, manganese dioxide sludges originating from the use of potassium permanganate in organic synthesis processes can also be used as the raw material. In this case, the conversion yields are greater, not being limited by the particle size of the material.

The reaction material, with the manganese in the form of potassium manganate ($K_2MnO_4$) crystals, is mixed continuously in a solution of mother liquors originating from the crystallization of potassium permanganate, in an appropriate proportion for obtaining a potassium manganate solution containing 50-60 g/l. To this mixture, lime [$Ca(OH)_2$] is added to precipitate silicates and aluminates in solid form. Under these conditions, the manganate dissolves and the whole mixture is filtered and clarified.

The invention represents a great innovation in the process for the industrial production of potassium permanganate, a product which is in growing demand from the most diverse fields of application. The invention consists of a method for producing potassium manganate ($K_2MnO_4$), an intermediate in the manufacture of potassium permanganate, from manganese dioxide ($MnO_2$) in pyrolusite ores or from other sources.

The process of attack and disintegration of the pyrolusite ore by potassium hydroxide, for its subsequent oxidation by means of atmospheric oxygen to manganese compounds of valencies $Mn^{5+}$ and $Mn^{6+}$, requires conditions of potassium hydroxide concentration of more than 65% by weight (w/w) and temperature conditions of more than 200° C.

The methods for carrying out this process recorded in the existing industrial literature involve the handling of mixtures of ore and potassium hydroxide in the liquid state and in substantial quantities, with difficulties in respect of corrosion for the construction materials of the equipment, and the difficulties of heat transfer and mass transfer required for the process. The former difficulties make it obligatory to construct the equipment with especially expensive materials, or to renew them frequently, and the latter difficulties result in excessively long residence times for the materials being processed.

The great innovative advantages of the method which is the subject of this invention consist in:

changing the reaction units of the reaction mixture to microscopic sizes, at which the mass and heat transfer phenomena involved in the process are virtually instantaneous, enabling the residence times of the materials being processed to be very substantially shortened;

handling a reaction mixture, until it enters the reactor, at ambient temperature and at potassium hydroxide concentrations below 50% by weight (w/w), which conditions permit the use of low-cost materials in the equipment, based on carbon steel, with a long life;

carrying out the stages of the process which require extreme conditions of potassium hydroxide concentration and temperature by maintaining the reaction mixture in the form of small droplets suspended in a gaseous atmosphere, without giving rise to corrosion phenomena in the reactor materials;

being able to carry out the process continuously in two synchronized phases, in two reactors connected in series, and being able to adjust the conditions in each reactor to the optimum conditions required for the process, including the composition of the gaseous atmosphere in the reactors;

being able to employ a reaction mixture having a mole ratio KOH/Mn of the order of 2.5, a value lower than the stoichiometric value required for the process, which necessarily proceeds via the product potassium hypomanganate ($K_3MnO_4$) in which the mole ratio KOH/Mn is 3. In this case, the advantage relates to a reduction in the costs of conversion in the production of potassium permanganate, since the proportions of recovery of potassium hydroxide in the process are reduced;

being able to use, in the process, manganese dioxide ores of any type, and essentially those which are most readily available commercially and most economical, such as the pyrolusite ores used in large amounts in the steel industry. With this method, the impurities which normally accompany the ore do not interfere in the process and do not adversely affect the degree of conversion and exploitation;

being able to achieve degrees of conversion of the manganese present in the ore, or in other compounds which can be used for the process, higher than 95%;

enabling good use to be made of the residual heat, resulting from the energy requirements of the process, at other points of the process where the heat levels are lower, thereby constituting an energetically integrated process with its attendant economic advantages;

being a method which permits great versatility in the working capacity, and which consequently permits ready adaptation to the immediate requirements of the market, with the economic and financial advantage which this carries;

being able to use reactors in the process which are similar in design to that of atomization dryers and plate dryers using standard technology which are commercially available items of chemical engineering equipment;

being a method which permits precise and continuous control of the process, under its optimal physicochemical conditions, with a minimum of material being processed and, in consequence, the start-up and shut-down times of the production system being very short;

being able to extract the materials from the different reactors in the form of a disintegrated and powdered solid product, under gravity; and constituting a productive, self-consistent assembly employing technically well-developed equipment of low complexity which ensures continuity of operation and automated handling without the direct involvement of manpower.

I claim:

1. A process for preparing potassium manganate ($K_2MnO_4$) comprising the steps of:
   (a) mixing a starting material containing a manganese ore having manganese in the form of manganese dioxide or manganese with a valency lower than or equal to 4+ with a first solution of potassium hydroxide in water to form a second solution having a mole ratio of potassium hydroxide to manganese in the approximate range of 2 to 3; and
   (b) atomizing said second solution into drops into a heated oxidizing gas stream in a first reactor vessel having a wall, said drops of said atomized second solution being of a sufficiently small size and the temperature of said oxidizing gas stream being sufficiently high that said drops lose water and solidify to a powder prior to contacting said wall, whereby said manganese is oxidized so said powder comprises potassium hypomanganate and potassium manganate.

2. A process according to claim 1, wherein said gas stream is at a temperature in the range of approximately 500° C. plus or minus 100° C.

3. A process according to claim 1, wherein said first reactor vessel has an upper end, and a lower end of conical shape.

4. A process according to claim 3, wherein said upper end of said first reactor vessel has an inlet for said gas stream.

5. A process according to claim 3, wherein said second solution is atomized by a liquid centrifugal atomizer, said atomizer being positioned in said upper end of said first reactor vessel.

6. A process according to claim 5, wherein the speed of said atomizer may be adjusted to produce drops of a size that are capable of being supported and conveyed by said stream.

7. A process according to claim 3, further comprising the step of:
contacting said powder with an oxidizing gas in a second oxidizing step to produce potassium manganate, and wherein said second oxidizing step occurs in a second reactor vessel.

8. A process according to claim 7, wherein said second reactor vessel has an inlet for oxidizing gas.

9. A process according to claim 7, wherein said second reactor vessel has a plurality of plates for receiving and supporting said powder.

10. A process according to claim 9, wherein said second reactor vessel has heating means for heating said plates to a temperature in the range of between 200° C. to 300° C.

11. A process according to claim 1, wherein said starting material is an ore which contains manganese dioxide.

12. A process according to claim 11, wherein said ore is ground to a fineness of less than about 80 microns.

13. A process according to claim 1, wherein said starting material is manganese dioxide sludge.

14. A process according to claim 1, wherein said first solution has a concentration of approximately 50% potassium hydroxide by weight.

15. A process according to claim 1, wherein said mole ratio of potassium hydroxide to manganese oxide is 2.5.

16. A process according to claim 1, wherein said oxidizing gas is a mixture of water, air and oxygen.

17. A process according to claim 1, wherein said first oxidizing step occurs in the range of about 20 to 50 seconds.

18. A process according to claim 1, wherein the heated oxidizing gas of said first oxidizing step is provided at a constant feed rate and temperature.

19. A process according to claim 11, wherein the rate said starting material is fed to said first reactor vessel and atomized is adjusted until said powder resulting from said first oxidizing step and the oxidizing gas of said first oxidizing step achieve a temperature in the range of 200° C. to 300° C.

20. A process according to claim 11, wherein the oxidizing gas of said first oxidizing step comprises oxygen and water and is extracted after reaction and recirculated after restoration of its partial pressures of oxygen and water, said partial oxygen pressure being restored by adding clean air or oxygen, and the partial pressure of water being restored by saturation with water vapor.

21. A process according to claim 20, wherein the restored oxidizing gas is heated before being provided in said stream.

22. A process according to claim 3, wherein the oxidizing gas in said stream of said first oxidizing step is extracted through a collector connected to said lower end of conical shape of said first reactor vessel, and drawn to a first cooling section of a gas cooling tower where said oxidizing gas exchanges its latent heat with an aqueous solution of potassium hydroxide and potassium permanganate.

23. A process according to claim 11, wherein said first oxidizing step occurs at a constant temperature, and at a pressure of approximately atmospheric pressure.

24. A process according to claim 7, wherein the first oxidizing step takes place in a first reaction vessel and the second oxidizing step takes place in a second reaction vessel with said powder passing continuously from said first reaction vessel to said second reaction vessel through at least one valve that isolates said first reaction vessel and said second reaction vessel.

25. A process according to claim 9, wherein said plates in said second reactor vessel are positioned in cascade providing relation one above the other and wherein said powder is distributed in layers on the surface of at least one of the plates and stirred by blade means to cause said powder to advance from plate to plate in cascade manner while being exposed to and reacting with the oxidizing gas.

26. A process according to claim 10, further including heating the plates of said second reactor vessel by the circulation of a heat transfer fluid through each of said plates.

27. A process according to claim 7, wherein the oxidizing gas of said second oxidizing step comprises water and oxygen in a molar ratio of water to oxygen in the range of approximately 2:1.

28. A process according to claim 7, wherein the reaction between said powder comprising potassium hypomanganate and potassium manganate and the oxidizing gas of said second oxidizing step occurs in the range of about 20 to 60 minutes.

29. A process according to claim 7, further including regulating the ratio of oxygen in the oxidizing gas of said second oxidizing step by measuring the proportion of oxygen in said oxidizing gas and adjusting the proportion of water to oxygen in said oxidizing gas.

30. A process according to claim 7, wherein said second reactor vessel is maintained at a pressure of approximately atmospheric pressure by evacuation of excess oxidizing gas.

31. A process according to claim 24, wherein the first reaction vessel and said second reaction vessel are arranged in series so that said powder produced in said first oxidizing step in said first reaction vessel flows without interruption from said first reaction vessel into said second reaction vessel, allowing for the continuous production of potassium manganate.

32. A process according to claim 1, including solubilizing the potassium manganate into an aqueous solution of potassium hydroxide and potassium permanganate, clarifying said aqueous solution, and electrolytically oxidizing said aqueous solution to convert said potassium manganate to potassium permanganate.

* * * * *